United States Patent
Maigler

(10) Patent No.: US 9,815,458 B2
(45) Date of Patent: Nov. 14, 2017

(54) METHOD AND DEVICE FOR OPERATING A HYBRID VEHICLE

(71) Applicant: Robert Bosch GmbH, Stuttgart (DE)

(72) Inventor: Peter Maigler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/104,593

(22) PCT Filed: Nov. 14, 2014

(86) PCT No.: PCT/EP2014/074582
§ 371 (c)(1),
(2) Date: Jun. 15, 2016

(87) PCT Pub. No.: WO2015/090752
PCT Pub. Date: Jun. 25, 2015

(65) Prior Publication Data
US 2016/0355175 A1    Dec. 8, 2016

(30) Foreign Application Priority Data
Dec. 19, 2013   (DE) .................. 10 2013 226 621

(51) Int. Cl.
*B60W 20/50*    (2016.01)
*B60W 50/038*   (2012.01)
(Continued)

(52) U.S. Cl.
CPC ............ *B60W 20/50* (2013.01); *B60W 10/06* (2013.01); *B60W 10/08* (2013.01); *B60W 30/02* (2013.01);
(Continued)

(58) Field of Classification Search
CPC ..................................................... B60W 20/50
See application file for complete search history.

(56) References Cited

U.S. PATENT DOCUMENTS 5,866,810 A * 2/1999 Ries-Muller ............ F02B 77/08
123/436
2010/0185360 A1   7/2010 Windbergs et al.

FOREIGN PATENT DOCUMENTS

DE    19649484    6/1998
DE    19902949    8/2000
(Continued)

OTHER PUBLICATIONS

International Search Report for Application No. PCT/EP2014/074582 dated Feb. 4, 2015 (English Translation, 2 pages).

*Primary Examiner* — John Walters
*Assistant Examiner* — James Triggs
(74) *Attorney, Agent, or Firm* — Michael Best & Friedrich LLP

(57) ABSTRACT

A method (110), a device (10), and a powertrain (70) are provided for the safe operation of a hybrid vehicle (20). The hybrid vehicle has at least one first (30) and one second (40) drive assembly. The drive assemblies in each case drive the hybrid vehicle, alone or jointly in a hybrid type of operation. The first drive assembly is operated using fuel from a fuel tank (50). An amount of fuel in this fuel tank is monitored. If the amount of fuel is smaller than a specifiable value, then a safety operation of the hybrid vehicle is activated. During the safety operation, the output of the second drive assembly is reduced if the hybrid vehicle is driven using a type of operation which negatively influences the driving dynamics of the hybrid vehicle in the case of a failure of the first drive assembly.

8 Claims, 1 Drawing Sheet

(51) Int. Cl.
*B60W 30/02* (2012.01)
*B60W 10/06* (2006.01)
*B60W 10/08* (2006.01)

(52) U.S. Cl.
CPC ....... *B60W 50/038* (2013.01); *B60W 2560/02* (2013.01); *B60W 2710/0666* (2013.01); *B60W 2710/083* (2013.01); *B60W 2710/086* (2013.01); *B60Y 2200/92* (2013.01); *B60Y 2300/188* (2013.01); *Y10S 903/93* (2013.01)

(56) References Cited

FOREIGN PATENT DOCUMENTS

| | | |
|---|---|---|
| DE | 102007030992 | 1/2009 |
| DE | 102008001669 | 11/2009 |
| JP | 2012101616 | 5/2012 |
| WO | 2013094557 | 6/2013 |

* cited by examiner

METHOD AND DEVICE FOR OPERATING A HYBRID VEHICLE

BACKGROUND OF THE INVENTION

The invention relates to a method, a device and a powertrain for operating a hybrid vehicle.

Hybrid vehicles already on the market are characterized in that said vehicles, on the one hand, have a plurality of drive assemblies and, on the other hand, comprise a control system for implementing an operating strategy, which selects a specific type of operation of the two drive assemblies in dependence on the current ambient conditions. The hybrid vehicle can thus be driven alone by one of the drive assemblies or jointly by both of the assemblies. There are also types of operation which are selected on the basis of energy-related or dynamic advantages. Energy-related advantages can, for example, be achieved with a type of operation in which an internal combustion engine is operated at an optimal operating point while an electric machine is not being used to drive the vehicle. During this time period, the electric machine is operated as a generator for generating electrical energy and charging a battery or, respectively, providing electrical loads with electrical energy. Dynamic advantages are, for example, achieved in a type of operation in which the right and left wheel of an axle of a vehicle are driven with different torques or even with opposite torques in vehicles having individually driven wheels on a single axle. Using this type of operation, the handling of the vehicle can be significantly improved when traversing curves, i.e. when accelerating about the vertical axis.

As mentioned above, the different types of operation are selected as a function of different ambient conditions. The German patent application DE 10 2008 001 669 A1 thus discloses that, when the fuel tank level is low, a vehicle is switched over into a type of operation which enables the hybrid vehicle to have a maximum range at a minimum amount of fuel consumption. In addition, the German patent application DE 199 02 949 discloses how to optimize the operation of an internal combustion engine when the tank fill level is low. Methods, which are required to this end, for determining a tank fill level or for detecting a tank that is almost empty are sufficiently known from the German patent application DE 10 2007 030 992 or from the German patent application DE 196 494 84.

If a vehicle is operated, in the fuel tank of which there is no longer much fuel, the probability increases that a drive assembly operated with fuel unexpectedly malfunctions due to the fuel tank approaching empty or being empty. An unexpected failure of a drive assembly leads to an unexpected drop in the driving power or the driving torque of the drive assembly. This can lead to an unexpected and thus critical positive or negative acceleration of the drive wheel and consequently of the vehicle; and said failure can thus negatively impact the handling of the vehicle. Depending on the type of operation in which a hybrid vehicle is operated at the moment of the failure of a drive assembly, the loss of the driving power can cause the vehicle to accelerate at unexpected rates which vary in degree and therefore vary in how critical they are to the safety of the vehicle. The loss of the driving power of a drive assembly of a hybrid vehicle can particularly lead to significantly greater accelerations that are critical to the safety of the vehicle than is the case with conventional vehicles which are solely operated with an internal combustion engine. Hence, the security risk during operation of a hybrid vehicle, in the tank of which no longer much fuel is present, can be increased depending on the type of operation being used.

A technical solution is therefore sought to further secure a hybrid vehicle, i.e. to operate said vehicle without an increased security risk, even if no longer much fuel is present in the fuel tank of the hybrid vehicle.

SUMMARY OF THE INVENTION

A method is provided for the safe operation of a hybrid vehicle. The hybrid vehicle has at least one first and one second drive assembly. The drive assemblies in each case drive the hybrid vehicle, alone or jointly in a hybrid type of operation. The first drive assembly is operated using fuel from a fuel tank. An amount of fuel in this fuel tank is monitored. If the amount of fuel is smaller than a specifiable value, then a safety operation of the hybrid vehicle is activated. According to the invention, the output of the second drive assembly is reduced during the safety operation if the hybrid vehicle is driven using a type of operation which negatively influences the driving dynamics of the hybrid vehicle in the case of a failure of the first drive assembly.

An operating strategy is thus provided for a hybrid vehicle in which the amount of fuel in the fuel tank is constantly monitored. If it is determined that less than a predefined amount of fuel is present, a safety operation is activated. This safety operation means that a check is made to determine in which type of operation the hybrid vehicle is currently being operated. If the current type of operation negatively influences the driving dynamics of the hybrid vehicle in the case of a failure of the first drive assembly, the output of the second drive assembly is then reduced during the safety operation.

In so doing, a check is made during the safety operation whether a type of operation is currently being used which negatively influences or does not negatively influence the driving dynamics of the hybrid vehicle in the case of a failure of the first drive assembly. The so-called load point shift is an example of a type of operation which negatively influences the driving dynamics in the case of a failure of the first drive assembly. This type of operation is characterized in that the first drive assembly driven with fuel is operated at an optimal operating point. At this operating point, the first drive assembly delivers more power than the vehicle currently requires for the drive and operation thereof. This excess power output is received by the second drive assembly, particularly an electrical machine operated as a generator, and converted into electrical energy. In so doing, the second drive assembly generates a high torque, which acts in a decelerating manner in the opposite direction of the torque of the first drive assembly. Should the first drive assembly now unexpectedly fail, not only, in this type of operation, does the loss of the torque of the first drive assembly act in a decelerating manner on the vehicle in the direction opposite to the current driving direction, but also the decelerating torque of the second drive assembly has the same effect. This would lead to a very strong, unexpected deceleration of the vehicle and thus to a negative influence on the driving dynamics that could impair the safety of the vehicle. In order to prevent this negative influence to the greatest possible extent, the power output of the second drive assembly is reduced if the safety operation is activated because only an amount of fuel is still available in the fuel tank which is less than a predefined amount.

An example of a type of operation which does not negatively impact the driving dynamics in the case of a failure of the first drive assembly is the joint drive of the hybrid vehicle, wherein the first drive assembly generates a small portion and the second drive assembly a predominant portion of the drive output of the hybrid vehicle. A smaller portion can particularly be in this case 5-45% and a predominant portion correspondingly 95-55% of the drive output. If the first drive assembly were to now unexpectedly fail, only the loss of the torque of the first drive assembly has a decelerating effect on the vehicle, and the vehicle would continue to be moved in the same direction by the second drive assembly. This would lead to a very slight unexpected deceleration of the vehicle, which, however, would not cause a negative influence on the driving dynamics that would be critical to the safety of the vehicle. Even if the safety operation is activated because only an amount of fuel is available in the fuel tank which is less than a predefined amount, the drive output of the second drive assembly is not reduced in this case because a type of operation which would negatively impact the driving dynamics of the hybrid vehicle in the case of a failure of the first drive assembly is not being used.

This method advantageously facilitates a safer operation of the hybrid vehicle even if the vehicle is operated using a type of operation which would negatively influence the driving dynamics of the hybrid vehicle in the case of a failure of the first drive assembly and if the probability of an unexpected failure of the first drive assembly is increased because no longer much fuel is present in the fuel tank of the hybrid vehicle.

In one embodiment of the invention, the output of the second drive assembly is reduced during the safety operation if a hybrid type of operation is used which negatively influences the driving dynamics of the hybrid vehicle in the case of a failure of the first drive assembly.

A safe operation of the hybrid vehicle is advantageously facilitated using this embodiment even if the vehicle is operated in a type of operation which negatively influences the driving dynamics of the hybrid vehicle in the case of a failure of the first drive assembly. Hybrid types of operation are the types of operation, in which the first and the second drive assembly are simultaneously operated in the hybrid vehicle, independently of the direction of the torque acting on the individual drive assemblies. In hybrid types of operation, the drive assemblies are particularly mechanically coupled directly to the respectively at least one drive wheel, wherein a closed coupling is also understood as a direct mechanical coupling in this context.

In one embodiment of the invention, the output of the second drive assembly is reduced during the safety operation in a type of operation, in which the output of the second drive assembly negatively influences the driving dynamics of the hybrid vehicle in the case of a failure of the first drive assembly.

A safe operation of the hybrid vehicle is advantageously facilitated using this embodiment even if the vehicle is operated in a type of operation which negatively influences, in particular additionally negatively influences, the driving dynamics of the hybrid vehicle in the case of a failure of the first drive assembly. A, particularly additional, negative influence on the driving dynamics of the hybrid vehicle is then present if the direction of the torque of the second drive assembly is opposite to the direction of the torque of the active first drive assembly.

In another embodiment of the invention, the output of the second drive assembly is reduced during the safety operation when a type of operation is used in which the torque of the second drive assembly is directed oppositely to the torque of the first drive assembly.

A safe operation of the hybrid vehicle is facilitated using this embodiment even if the vehicle is operated using a type of operation which additionally negatively influences the driving dynamics of the hybrid vehicle in the case of a failure of the first drive assembly. An additional negative influence on the driving dynamics of the hybrid vehicle is then present if the direction of the torque of the second drive assembly is opposite to the direction of the torque of the active first drive assembly.

In another embodiment of the invention, the output of the second drive assembly is reduced during the safety operation when using a type of operation, in which the acceleration about the transverse axis, vertical axis or longitudinal axis of the hybrid vehicle, which takes effect in the case of a failure of the first drive assembly, is intensified by the output of the second drive assembly.

A safe operation of the hybrid vehicle is facilitated in this embodiment even if the vehicle is operated using a type of operation in which the acceleration about the transverse axis, vertical axis or longitudinal axis of the hybrid vehicle, which takes effect in the case of a failure of the first drive assembly, is intensified by the output of the second drive assembly. The acceleration about the transverse axis, vertical axis or longitudinal axis of the hybrid vehicle, which takes effect in the case of a failure of the first drive assembly, is then intensified if the direction of the torque of the second drive assembly is opposite to the direction of the torque of the active first drive assembly. For example, the acceleration about the vertical axis, which takes effect in the case of a failure of the first drive assembly, is increased by the output of the second drive assembly if, in vehicles having individually driven wheels on a single axle, the right and left wheel of an axle of a vehicle are driven using a type of operation having different torques or even opposite torques. This type of operation is referred to as torque vectoring and is especially used in vehicles having single wheel drives.

In another embodiment of the invention, the output of the second drive assembly is reduced during the safety operation in the case of the hybrid type of operation known as load point shift or in the case of torque vectoring.

A safe operation of the hybrid vehicle is facilitated using this embodiment even if the vehicle is operated in the types of operation known as load point shift or torque vectoring. The distribution of the drive output on the two drive assemblies in the case of these types of operation can be extracted from the previous embodiments.

In another embodiment of the invention, the second drive assembly is switched off during the safety operation when using a type of operation which negatively influences the driving dynamics of the hybrid vehicle in the case of a failure of the first drive assembly.

A safe operation of the hybrid vehicle is advantageously facilitated using this method even if the vehicle is operated in a type of operation which would negatively influence the driving dynamics of the hybrid vehicle in the case of a failure of the first drive assembly and the probability of an unexpected failure of the first drive assembly is increased because no longer much fuel is present in the fuel tank of the hybrid vehicle.

A device for the operation of a hybrid vehicle is furthermore provided. The hybrid vehicle has a first and a second drive assembly. The drive assemblies in each case drive the hybrid vehicle, alone or jointly in a hybrid type of operation. The first drive assembly is operated using fuel from a fuel tank. Provision is made for a sensor device which monitors an amount of fuel in the fuel tank. The device activates a safety operation of the hybrid vehicle if the fuel amount is smaller than a specifiable value. According to the invention, the device reduces the output of the second drive assembly during the safety operation if a type of operation is used which negatively influences the driving dynamics of the hybrid vehicle in the case of a failure of the first drive assembly.

A safe operation of the hybrid vehicle is advantageously facilitated by means of this device even if the vehicle is operated in a type of operation which would negatively influence the driving dynamics of the hybrid vehicle in the case of a failure of the first drive assembly and the probability of an unexpected failure of the drive assembly is increased because no longer much fuel is present in the fuel tank.

A powertrain for a hybrid vehicle comprising a first and a second drive assembly is furthermore provided. The drive assemblies in each case drive the hybrid vehicle, alone or jointly in a hybrid type of operation. The first drive assembly is operated using fuel from a fuel tank. The powertrain comprises a sensor device which monitors an amount of fuel in the fuel tank and a device which activates a safety operation of the hybrid vehicle if the amount of fuel is smaller than a specifiable value. According to the invention, the device reduces the output of the second drive assembly during the safety operation if a type of operation is used which negatively influences the driving dynamics of the hybrid vehicle in the case of a failure of the first drive assembly.

A safe operation of the hybrid vehicle is advantageously facilitated by means of this powertrain even if the vehicle is operated in a type of operation which would negatively influence the driving dynamics of the hybrid vehicle in the case of a failure of the first drive assembly and the probability of an unexpected failure of the drive assembly is increased because there is no longer much fuel present in the fuel tank of the hybrid vehicle.

In one embodiment of the invention, the first drive assembly is an internal combustion engine and/or the second drive assembly is an electrical machine.

The internal combustion engine is advantageously operated with fuel and the electrical machine is supplied with electrical energy. When the amount of fuel becomes less, the electrical machine can thus independently drive the vehicle.

It goes without saying that the features, properties and advantages of the method according to the invention correspondingly apply to or can be applied to the device according to the invention or, respectively, to the powertrain and vice versa.

Further features and advantages of embodiments of the invention ensue from the following description with reference to the attached drawings.

Figure 1:
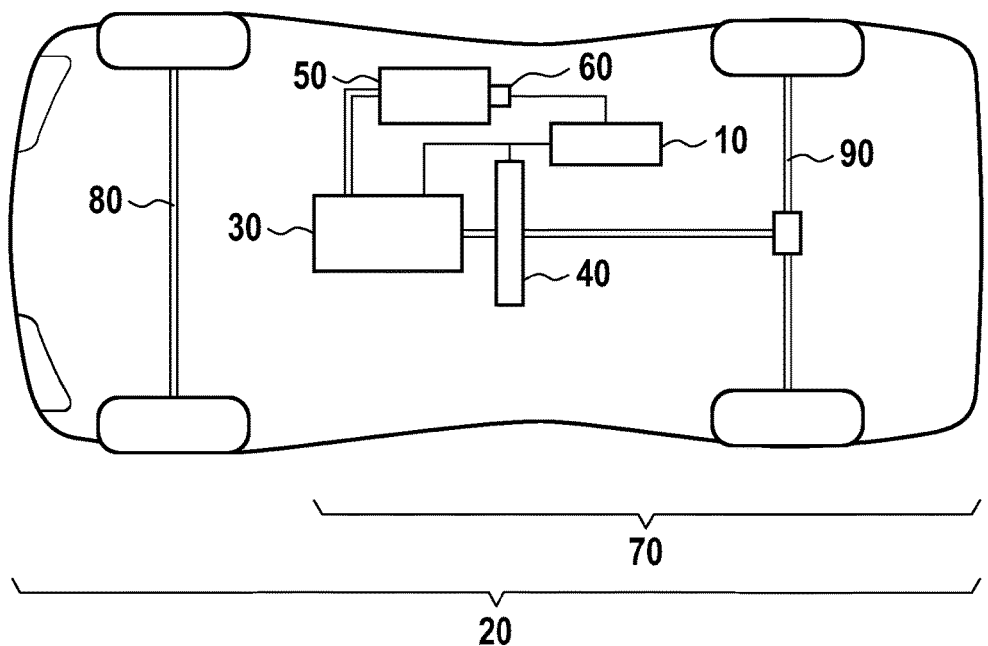
FIG. 1 shows schematically a hybrid vehicle comprising a device for the operation of a hybrid vehicle.

In the figures, identical and functionally identical elements, features and components—provided that nothing else is specified—are in each case provided with the same reference signs. It goes without saying that components and elements are not necessarily depicted true to scale in the drawings for reasons of clarity.

Further possible configurations, modifications and implementations of the invention also do not comprise explicitly stated combinations of features of the invention which have been previously described or will be described below.

DETAILED DESCRIPTION

FIG. 1 shows schematically a hybrid vehicle 20 comprising a front axle 80 and a driven rear axle 90. The hybrid vehicle includes a powertrain 70 comprising a first and a second drive assembly 30, 40, a device 10 and a sensor unit 60. A first drive assembly 30 and a second drive assembly 40 can be mechanically coupled and jointly drive the rear axle 90 of the hybrid vehicle. The device 10 is designed to actuate the two drive assemblies 30 and 40. To this end, the device 10 in each case particularly specifies a rotational speed (n) and a torque (Nm) or, respectively, an output (W) for the two drive assemblies 30 and 40. In order to ensure a safe operation of the hybrid vehicle 20, the amount of fuel in a fuel tank 50 is constantly monitored by means of a sensor device 60. If only a small amount of fuel is still available in the fuel tank 50 for the operation of the first drive assembly 30, the device 10 then switches on a safety operation. While the safety operation is activated, the device 10 reduces the output of the second drive assembly 40 in a type of operation which negatively influences the driving dynamics of the hybrid vehicle 20. The hybrid vehicle schematically depicted in FIG. 1 comprises, for example, a so-called parallel hybrid drive as a powertrain topology, said parallel hybrid drive comprising an internal combustion engine as the first drive assembly 30 and an electrical machine 40 as the second drive assembly. The invention is, however, independent of the powertrain topology used and can therefore, for example, also be implemented in the case of axle-split or power-split hybrid powertrain topologies or in the case of all other powertrain topologies.

Figure 2:
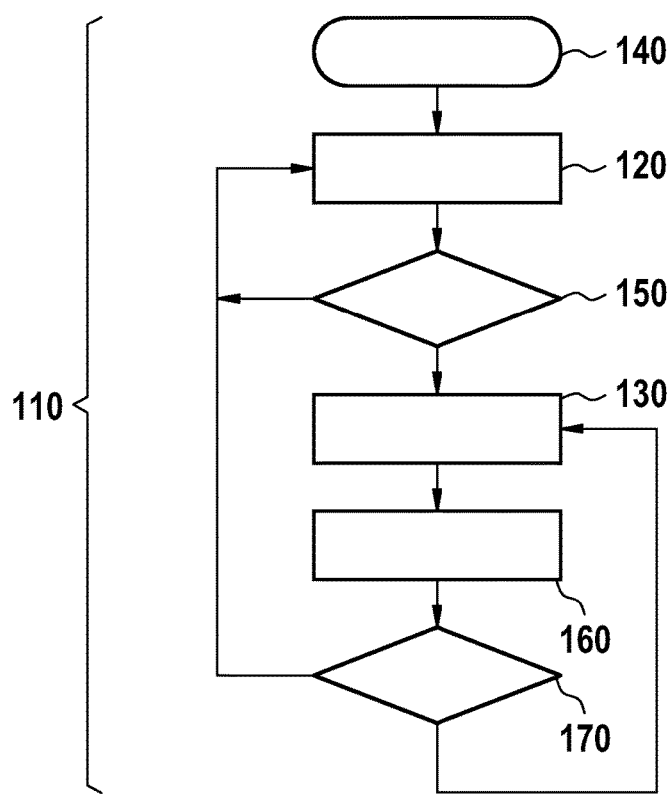
FIG. 2 shows schematically a method for the operation of a hybrid vehicle.

FIG. 2 shows a method 110 for the safe operation of a hybrid vehicle 20. After starting the method in step 140, the amount of fuel which is situated in the fuel tank 50 is determined in step 120. In the following comparison step 150, the determined amount of fuel is compared to a specifiable value. If the amount of fuel is greater than the specifiable value, the method jumps back to step 120 for the renewed determination of the amount of fuel. If the amount of fuel is smaller than the specifiable value, a device 10 activates a safety operation 130. While the safety operation is activated, the device 10 reduces the output of the second drive assembly 40 if a type of operation is being used which negatively influences the driving dynamics of the hybrid vehicle 20. In the following step 160, the amount of fuel is determined analogously to step 120. In the succeeding comparison step 170, the determined fuel amount is compared to a specifiable value. If the amount of fuel is greater than the specifiable value, the device 10 deactivates the safety operation and the method jumps back to step 120 for the renewed determination of the fuel amount. If the fuel amount is smaller than the specifiable value, the method jumps back to step 130, in which the device 10 further maintains the safety operation 130. While the safety operation is activated, the device 10 reduces the output of the second drive assembly 40 if a type of operation is being used which negatively influences the driving dynamics of the hybrid vehicle.

The invention claimed is:

1. A method (110) of operation of a hybrid vehicle (20), wherein the hybrid vehicle (20) has a first (30) and a second (40) drive assembly,
  wherein the drive assemblies (30, 40) in each case drive the hybrid vehicle (20), alone or jointly in a hybrid type of operation,
  wherein the first drive assembly (30) is operated with fuel from a fuel tank (50) and an amount of fuel in the fuel tank (50) is monitored (120, 160),
  wherein a safety operation (130) of the hybrid vehicle is activated if the amount of fuel is smaller than a specifiable value (150, 170),
  characterized in that
  the output of the second drive assembly (40) is reduced during the safety operation (130) when a type of operation is being used in which the torque of the second drive assembly (40) is directed oppositely to the torque of the first drive assembly (30).

2. A method (110) of operation of a hybrid vehicle (20), wherein the hybrid vehicle (20) has a first (30) and a second (40) drive assembly,
  wherein the drive assemblies (30, 40) in each case drive the hybrid vehicle (20), alone or jointly in a hybrid type of operation,
  wherein the first drive assembly (30) is operated with fuel from a fuel tank (50) and an amount of fuel in the fuel tank (50) is monitored (120, 160),
  wherein a safety operation (130) of the hybrid vehicle is activated if the amount of fuel is smaller than a specifiable value (150, 170),
  characterized in that the output of the second drive assembly (40) is reduced during the safety operation (130) when a type of operation is being used in which the acceleration about the transverse axis, vertical axis or longitudinal axis of the hybrid vehicle (20), which takes effect in the case of a failure of the first drive assembly (30), is intensified by the output of the second drive assembly (40).

3. A method (110) of operation of a hybrid vehicle (20), wherein the hybrid vehicle (20) has a first (30) and a second (40) drive assembly,
  wherein the drive assemblies (30, 40) in each case drive the hybrid vehicle (20), alone or jointly in a hybrid type of operation,
  wherein the first drive assembly (30) is operated with fuel from a fuel tank (50) and an amount of fuel in the fuel tank (50) is monitored (120, 160),
  wherein a safety operation (130) of the hybrid vehicle is activated if the amount of fuel is smaller than a specifiable value (150, 170),
  characterized in that the output of the second drive assembly (40) is reduced during the safety operation (130) when a type of operation being used in the hybrid type of operation of load point shift or torque vectoring.

4. The method according to claim 3, characterized in that the second drive assembly (40) is switched off during the safety operation (130).

5. The method according to claim 1, wherein the type of operation being used is a hybrid type of operation.

6. The method according to claim 1, characterized in that the second drive assembly (40) is switched off during the safety operation (130).

7. The method according to claim 2, wherein the type of operation being used is a hybrid type of operation.

8. The method according to claim 2, characterized in that the second drive assembly (40) is switched off during the safety operation (130).

* * * * *